March 17, 1970 J. BOILEAU 3,500,888
PNEUMATIC TIRES AND MANUFACTURE OF THE SAME
Filed July 27, 1966 2 Sheets-Sheet 1
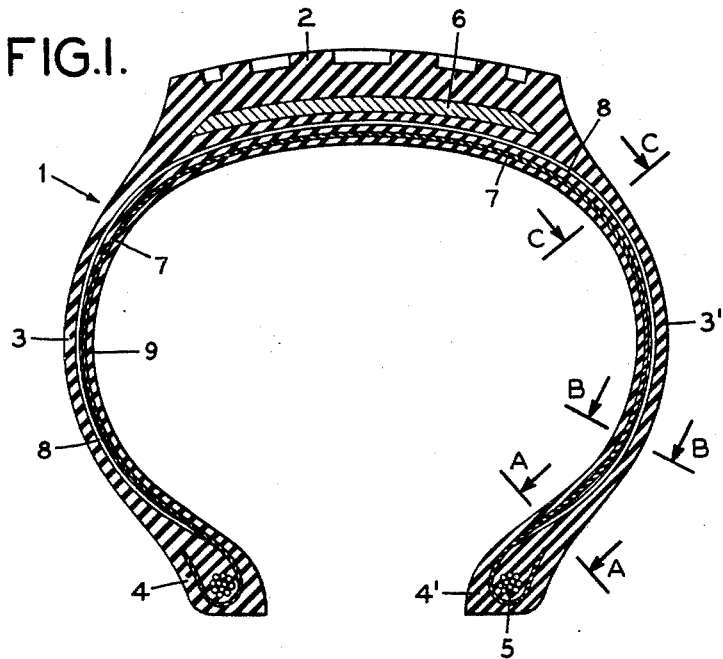
FIG.I.
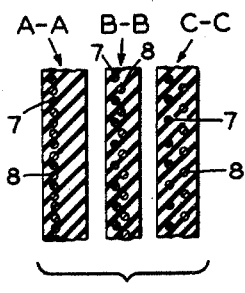
FIG.2.
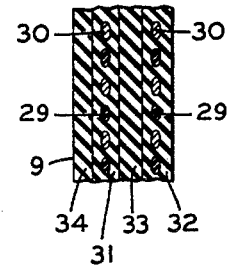
FIG.3.
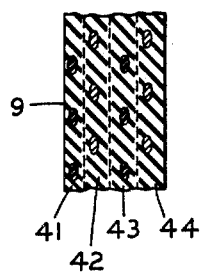
FIG.4.
FIG.5.
INVENTOR
JACQUES BOILEAU
BY
HIS ATTORNEYS

INVENTOR
JACQUES BOILEAU

United States Patent Office 3,500,888
Patented Mar. 17, 1970

3,500,888
PNEUMATIC TIRES AND MANUFACTURE
OF THE SAME
Jacques Boileau, Clermont-Ferrand, France, assignor to
Compagnie Generale des Etablissements Michelin, raison sociale Michelin & Cie, Clermont-Ferrand, France
Filed July 27, 1966, Ser. No. 568,222
Claims priority, application France, July 28, 1965,
26,414; June 20, 1966, 66,201
Int. Cl. B60c 9/06
U.S. Cl. 152—356
9 Claims

ABSTRACT OF THE DISCLOSURE

A pneumatic tire having a carcass ply of mixed cords, some being composed of heat shrinkable cords and some being composed of less heat shrinkable cords.

---

The present invention relates to improvements in pneumatic tires and methods of manufacture thereof, and particularly to improvements in the structure of the carcasses of the tires containing wires or cords placed in radial planes or crossed or bias-laid wires or cords forming on angle with the radial planes.

It is recognized that the stability of a tire rolling in a straight line and at great speed is improved either by stiffening the sidewalls of the tire, which will detract from comfort, or to reduce the grip on the road (traction of the tire), for example, by reducing the rigidity of the tread, with an adverse effect on performance in curves and increased wear and tear on the tire.

The present invention relates to a novel means for reinforcing the sidewalls of tires to improve their stability without detriment to comfort and without having to reduce the grip of the tires on the road. This result is obtained by a special arrangement of the carcass wires or cords.

In accordance with the invention, the new tire has a carcass formed of at least two layers of metallic or non-metallic cords which diverge from each other between each of the two beads and the tread, with at least one of these layers deviating increasingly from the inner wall of the cover.

In one embodiment of the invention, at least two layers of wires or cords of the carcass have, in a direction perpendicular to the wall of the cover, a spacing which is slight or zero in the region of the bead and increases progressively as the distance of the said layers from the bead increases and which, in the neighborhood of the tread assumes a value preferably several times greater than the diameter of the cords of the layers. In this form of the invention, the carcass comprises a plurality of layers of cords, the spacing between the layers transversely of the tire varying between the bead wire and the tread, with the least spacing being near the bead wire and the greatest spacing near the tread and having spacings of intermediate values between the inner and outer extremities of each sidewall. By replacing the conventional reinforcement of uniform thickness with a reinforcement of variable thickness with such thickness increasing from the bead wire towards the tread, an effect of gradual reinforcement of the sidewall is obtained which increases the transverse rigidity of the tire principally near the tread without detriment to flexibility of the sidewalls for the reason that the reinforcement remains relatively thin in a large part of the area of the sidewall near the bead. This form of the invention is well suited to both the radial-carcass tires and the so-called bias-carcass tires.

In a second embodiment of the invention related to the first one, the transverse spacing between layers of cords is zero in a zone or zones located at mid-height in each of the sidewalls of the tire, and wherein the two layers intersect and extend through each other. This form of the invention is applicable to radial-carcass tires.

In a third embodiment of the invention and likewise applicable to radial-carcass tires, the zones of zero separation of the plies or layers of cords are each located radially outside with respect to the mid-height of each sidewall and can merge into a single zone located in the longitudinal median zone of the tire.

The arrangements of the layers of cables of the carcass mentioned above may be obtained by any suitable means, for example, by causing a suitable variation of the thickness of the layer or layers of interposed elastomer between the layers or plies of cords in the course of manufacture of the tire. However, in accordance with the invention, a method is provided which is particularly simple, economical and effective in building or manufacturing tires of the types described above.

The method in accordance with the invention for manufacturing the new tires makes use of the phenomenon of contracting of some synthetic fibers when hot, known as heat-shrinkable fibers. For example, if a polyamide, polyester or polyvinyl alcohol cord is heated to temperatures in a range between 100 and 150° C., the fiber shrinks or contracts probably as a result of a modification in the direction of the molecular chains. This shrinking is preserved on cooling down, at least in part. Among the fibers having the characteristic of shrinking when heated, are the polyamides, especially "nylon," the polyesters, such as for example, "Dacron," and the polyvinyl alcohols. The extent of the contraction varies not only in accordance with the fibers but also depending on the stretching treatment under heat which the fibers undergo.

Other fibers which are used or usable in the manufacture of the new tires are not heat-shrinkable to an appreciable extent, e.g., rayon, steel and glass fibers.

In contrast to polyamide or polyester cords, rayon cords do not show any contraction when hot or at least, if this phenomenon exists at all, its extent is negligible and is cancelled out or masked by other phenomena. Therefore, the rayon behaves for all practical purposes like steel or glass.

The following table furnishes for various cords the force of contraction and the percentage of contraction measured at 100 and 150° C. Depending on the prior treatment, variations will occur in the results. However, such results remain substantially of the same magnitude. It has been found that the various cords at 150° C., i.e., a temperature close to the temperature at which tires are generally vulcanized, undergo considerable contraction stress which, if the cord is free to shrink, is translated into appreciable contraction or shrinkage on the order of 5 to 7% for polyamides and 3 to 4% for polyesters.

TABLE I

| Cord Material and Structure | Temperature, °C. | Contraction force in g | Contraction in percent |
|---|---|---|---|
| Polyamide type Nylon 66 untreated, 840 × 3 [1] | 100 | 375 | 2.6 |
|  | 150 | 605 | 7.0 |
| Polyamide type Nylon 66 treated, 840 × 3 [1] | 100 | 575 | 2.3 |
|  | 150 | 890 | 7.1 |
| Polyamide type Nylon 66 treated, 1,680 × 2 [1] | 100 | 540 | 1.9 |
|  | 150 | 925 | 5.8 |
| Polyester Dacron type, treated 1,100 3 × [1] | 100 | 240 | 0.8 |
|  | 150 | 575 | 3.1 |
| Do | 100 | 250 | 0.7 |
|  | 150 | 550 | 3.3 |
| Do | 100 | 250 | 0.7 |
|  | 150 | 575 | 4.2 |
| Do | 100 | 275 | 0.6 |
|  | 150 | 525 | 3.6 |

[1] Number of deniers and number of strands.

It will be understood that the invention is not limited to the use of polyamide or polyester cords: all cords which in an appreciable manner contract in heat may be used. It is sufficient, for example, that there exists at 150° C. a relative contraction of at least approximately 1% of the initial length of the two cords between the heat-shrinkable cord and the cord which does not shrink or shrinks very little.

In accordance with the invention, tires are manufactured by making a carcass including at least one mixed ply containing heat-shrinkable cords and cords which shrink less or which do not shrink at all when heated or a plurality of plies of cords, one ply being heat-shrinkable and the other ply having less shrinkable or non-shrinkable.

Reference hereinafter to a mixed ply shall mean a ply containing parallel cords embedded in rubber and arranged side by side and containing cords of different heat-shrinking characteristics arranged in a predetermined order.

The use of a mixed ply brings about a separation of the heat-shrinkable cords from those which do not shrink appreciably during the vulcanization of the cover. On vulcanization, at the beginning of heating, the various cords assume different forms of stability. The elastomer (natural or synthetic rubber, rubber mixtures or compositions and the like) surrounding the cords which has been softened by heating and is not yet vulcanized does not resist the displacement of the cords and the heat-shrinkable cords accordingly can shrink and be displaced transversely of the tire. After vulcanization and when the tire has cooled, the relative positions of the different cords assumed when hot are preserved or are not substantially modified. As the shrinkable and non-shrinkable or less shrinkable cords are substantially immobilized in the region of the bead and are anchored around the bead wires, it is mainly outside this region that a difference in the stability of the cords occurs, and this difference is greater the greater the radial distance the carcass is from the bead. It is advisable to provide for an elastomer layer of sufficient thickness inside the carcass in order to permit shrinking of the heat-shrinkable cords without shearing or tearing of the inner facing of the cover.

The following table discloses various combinations of cords which may be incorporated into one ply to obtain a mixed ply in accordance with the invention:

TABLE II

| Cords A | Cords B | Cords C |
|---|---|---|
| Polyamide | Polyamide | Rayon. |
| do | Polyester | Do. |
|  | do | Do. |
| Polyamide | do | Do. |
| do |  | Steel. |
|  | Polyester | Do. |
| Polyamide |  | Glass. |
|  | Polyvinyl alcohol | Do. |

The table shows that a ply may contain (1) cords which do not shrink in heat in combination with heat-shrinkable cords, or (2) different kinds of cords, both of which contract in heat but do so to different degrees, or (3) different kinds of cords, one of which does not contract in the heat and the two others of which contract in the heat but do so to different degrees.

As regards the proportion of each type of cord to be incorporated into a mixed ply, the simplest and also best solution consists in providing predetermined numbers of cords of each kind. It is advisable to select the structure of the cords (number of strands and strength of each strand) in such a manner as to substantially equalize the conditions of work and not to overload the cords of one kind to the detriment of the cords of the other kind. On the other hand, the cords may have different cross-sections. Moreover, it is possible to provide different proportions of the various types of cords, for example, to use two or three times more cords of one kind than of another, and to give them a different structure. A particularly simple and favorable solution consists in providing mixed plies comprising one rayon cord per polyamide or polyester cord.

The carcass may consist of a single mixed ply, the cords of which are arranged radially or may consist of several plies, some mixed and some homogenous or all mixed. In a carcass containing radial cords exclusively, the order of the plies, if there are more than one, is not material, inasmuch as the heat-shrinkable cords may take their position of equilibrium without being hindered by the other cords for the reason that the latter all have the same direction. However, it is preferable to arrange the ply or plies which are mixed on the inside of the carcass.

In case of a crossed ply or bias-ply carcass, it is preferable to provide between two mixed plies of bias cords an interposed rubber layer of a thickness sufficient to prevent the cords of the outer ply from reacting on the cords of the inner ply and from involving them in the shrinkage of the outer ply. Likewise, if a mixed ply and a homogenous ply, the respective cords of which cross, are superimposed, they should be arranged in suitable order or a layer of elastomer interposed between them so as not to hinder the shrinking of the heat-shrinkable cords.

Thus, in accordance with the invention, a carcass having two mixed plies only can be assembled in a tire which when vulcanized contains four layers of cords in the region of the sidewall extending between the tread and mid-sidewall.

In another form of tire embodying the invention, the carcass can be built with at least two different layers of cords, one of which consists of heat-shrinkable cords to be disposed adjacent the inside wall of the tire and another outer layer consisting of cords which do not shrink appreciably.

Other forms of tires embodying the invention may likewise be made containing two different layers arranged at a normal spacing in the finished cover, and to use layers or plies the cords of which do not necessarily form the same angle with the plane of symmetry of the cover and to produce a carcass having a greater mean thickness.

Tires in accordance with the invention may also include a composite ply consisting of two layers of cords which run parallel in each layer, the upper layer being formed of cords which contract in heat, the lower layer being formed of cords which do not contract, or contract less, in the heat, the spacing of the latter being smaller than the diameter of the cords of the upper layer but larger than that diameter divided by the ratio of maximum conformation. As used herein, "ratio of maximum conformation" means the quotient of the largest diameter of the carcass, measured in the finished cover, by the diameter of the bead wires.

In such a composite ply, the spacing apart of the cords of the inner layer is insufficient to permit passage of the cords of the outer layer between the cords of the inner layer in the vicinity of the bead wires. On the other hand, if the spacing is multiplied by the ratio of conformation, it becomes ample to enable the cords of the outer layer to pass through the inner layer in the region of the tread. Therefore, there necessarily exists between the bead wires and the longitudinal median plane of the cover (the zone of the largest diameter of the carcass) a zone wherein the spacing of the cords of the inner layer becomes sufficiently wide to enable the cords of the outer layer to move to positions between the cords of the inner layer. It is in this zone that the thickness of the carcass is the least or, in other words, that the distance between layers of cords becomes zero. By preference, this zone is located at approximately mid-height of each of the two sidewalls.

In a particularly advantageous form, the composite ply consists of two superimposed layers of cords separated by an elastomer layer, and the cords of the two layers are staggered by half the spacing between them from one cord to the other. The composition of the elastomer layer between the two cord layers may be selected such that its viscosity when hot is low and facilitates passage of the cords of the outer layer between the cords of the inner layer, at least in the zone of the composite ply in which the interpenetration is to take place. Conversely, the elastomer layer may have a composition and/or a thickness whereby it resists, in a given zone of the carcass, the aforesaid interpenetration.

The use of a composite ply thus constituted combines the advantages of the regular cord arrangement in the mixed ply described above with the advantage of high density in the different layers mentioned above. Furthermore, it enables one to provide composite plies wherein the tension of the cords of each layer of cords is not the same in the two layers, which facilitates a more uniform distribution between the layers of the stresses undergone by the carcass in the cover which is rolling.

The invention will be more fully understood by reference to the accompanying drawings, in which:

FIGURE 1 is a view in cross-section of a radial carcass tire cover embodying the present invention;

FIGURE 2 are sectional views taken on lines A—A, B—B and C—C of FIGURE 1, showing the positions of the cords in the sidewall of the tire at various levels in such sidewall;

FIGURE 3 is a sectional view on a larger scale of the cross-section of a tire sidewall with a carcass consisting of crossed cords, prior to heating and vulcanizing;

FIGURE 4 is a sectional view similar to that in FIGURE 3 showing the position of the cords after heating and vulcanizing;

FIGURE 5 is a vertical section of the crossed cords shown in cross-section in FIGURES 3 and 4, the spacing between the cords being exaggerated for the sake of clarity of design, and the elastomer wherein these cords are embedded being omitted;

Figure 6:
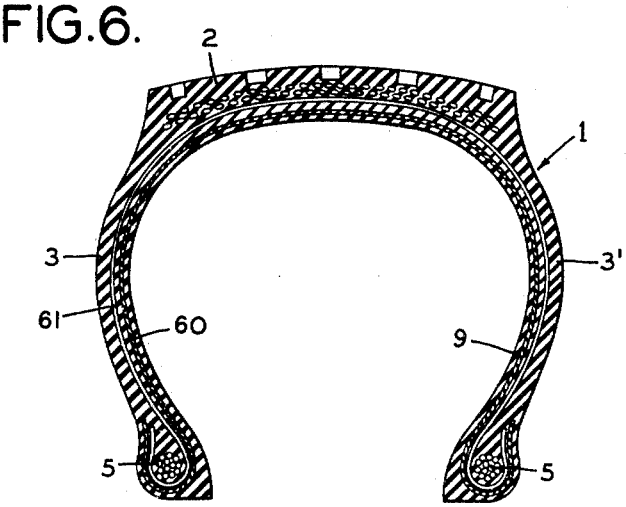
FIGURE 6 is a view in cross-section of a modified form of tire with a radial carcass, embodying the invention.

All the figures of the drawings disclose a tire 1 having a tread 2, sidewalls 3 and 3' extending inwardly from the edges of the tread and terminating in beads 4 and 4', each reinforced by a bead wire or cable 5. A reinforcement 6, composed, for example, of one or more plies of metal cords, extends beneath the tread 2.

The tire carcass represented in FIGURE 1 includes cords 7 which, in this example, are polyamide cords and rayon cords 8 arranged in substantially radial planes passing through the axis of rotation of the tire. The distance between the cords 7 and 8, measured perpendicular to the inner wall 9 of the cover, is practically zero in the lower part of the sidewall and increases progressively as its distance from that part increases and attains in the neighborhood of the tread a value of approximately twice the diameter of a cord as shown in FIGURE 2.

The carcass of the cover shown in FIGURE 1 is made of a single mixed ply in which the polyamide cords alternate with the rayon cords. During vulcanizing of the tire in the mold, the polyamide cords contract and draw nearer to the inner wall 9 of the tire while the rayon cords for all practical purposes did not move at all. Thus, the finished tire has a carcass consisting of a single layer of cords adjacent to the beads 4 and 4' which is separated into two layers of cords 7 and 8 which diverge progressively from each other as they are further removed from the inner portion of the sidewall, layer 8 being spaced a progressively increasing distances from the inner wall 9 of the cover and attaining its maximum spacing from the wall in the center zone of the tread.

FIGURES 3 and 4 show the cross-sections of the cords as elliptical in order to take into account the fact that the plane of the section indicated in FIGURE 5 by the line D—D is not perpendicular to the direction of the cords. FIGURES 3 to 5 illustrate the separation of the cords when the carcass consists of layers of cords which cross or are laid on a bias. Prior to heating and vulcanizing, the carcass comprises (see FIGURE 3) two mixed plies of polyamide cords 29 (shown in dark hatching) alternately with rayon cords 30 (shown in light hatching). In order to take into account the fact that in the course of heating, the polyamide cords will shrink and be displaced in the direction of the inner wall 9 of the cover, an elastomer layer 33 of a thickness sufficient to accommodate shrinkage of the polyamide cords originating in layer 32 is placed between the plies 31 and 32. The elastomer layer 34 constituting the wall 9 is likewise of a thickness which is sufficient to receive the polyamide cords originating in ply 31.

The position of the cords after vulcanization is shown in FIGURE 4. Within the elastomer, the polyamide cords and the rayon cords now form four layers 41, 42, 43 and 44 which are separated from one another by a distance which, in a manner similar to that shown in FIGURE 1, is practically zero in the inner portion of the sidewall and increases progressively in the direction of the tread. The cords of the layer 41 are parallel to those of layer 42; the cords of layer 43 cross the cords of the preceding layers and are parallel to the cords of layer 44.

In the tire shown in FIGURE 6, the space separating the two different layers of cords 60 and 61 which run parallel within each layer attains its maximum in that portion of each of the sidewalls 3 and 3' of the cover which is adjacent to the tread. The layer 60 consists of polyamide cords and the layer 61 consists of polyester cords.

During building of the tire on a cylindrical drum, the two layers 60 and 61 are placed one on top of the other, the space separating them being small and uniform between the two bead wires 5. As explained above, it is the difference between the shrinkages of these materials under the influence of the heat during vulcanization of the tire in a mold which causes progressive variations in the separation between the two layers. In the present case, the cords of the inner layer 60 consisting of polyamide shrink under the effect of the heat and, consequently, are spaced farther from the polyester cords of the outer layer 61 drawing closer to the inner wall 9 of the cover 1. The layer 61 is spaced from the wall 9 by a distance which increases as the layers are spaced farther from the bead wires 5.

Figure 7:
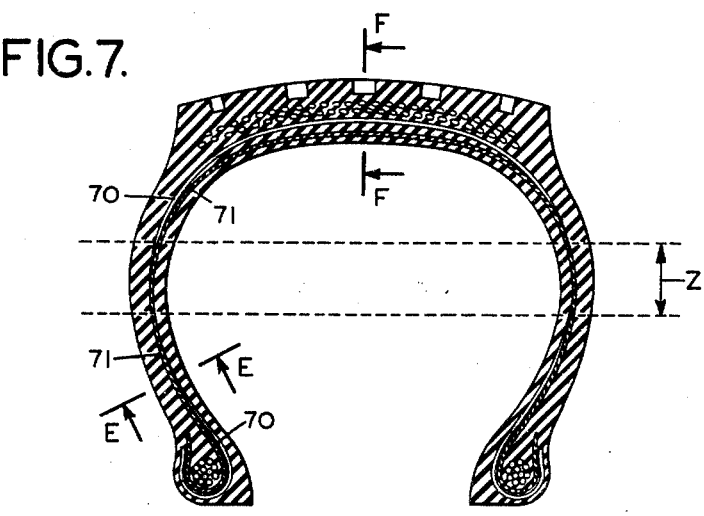
FIGURE 7 is a view in cross-section of still another form of radial carcass tire embodying the invention.

The tire disclosed in FIGURE 7 has a carcass consisting of a composite ply containing two layers of parallel cords 70 and 71 arranged in radial planes of the tire, separated by an interposed elastomer layer 72 of low viscosity when hot.

Figure 8:
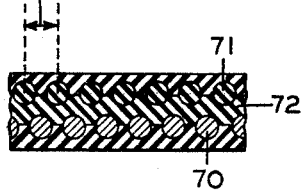
FIGURES 8 and 9 are cross-sectional views of composite plies taken on line E—E and line F—F of FIGURE 7.

The layer 70 consists of metal cords, the layer 71 of polyamide cords. Then building the tire on a cylindrical drum, the metal cord layer 70 is placed underneath the layer of polyamide cords 71. As shown in FIGURE 8, the spacing P between the cords 70, in this example and prior to shaping, is the same as that of cords 71 and the cords 71 are placed in such a manner that each of them is located at mid-distance between two cords 70. In this example, the ratio of conformation to be obtained is approximately 1.6, the diameter of the cords 70 and 71 is approximately 1.5 mm., and their distance P is approximately 2.3 mm.

Figure 9:
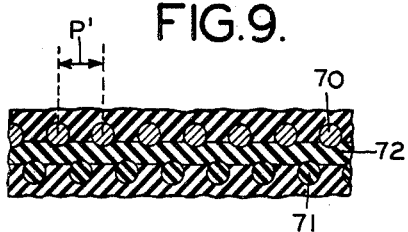

After shaping the tire, the cords 70 and 71 are spaced further apart. As shown in FIGURE 9, the distance P' between their centers measured in the region of the peak or tread zone of the tire is now approximately 3.7 mm. Furthermore, vulcanizing of the tire in the mold causes shrinking of the cords 71 which have passed between the cords 70 and are now located inwardly of them wherever the distance P' equals at least the sum of the diameters of cords 70 and 71, i.e., in this example, twice 1.5 mm. In the zone in which the distance P' remains less than 3 mm., the cords 71 do not pass through the ply of cords 70. In the region adjacent to the beads, the position of the cords is as shown in FIGURE 8 where the polyamide cords 71 are on the outside. In the zone Z located at mid-height of the sidewalls, the cords 71 are interposed between the cords 70 while underneath the tread 2 they are spaced inwardly of the cords 70. The layer of cords 70 is separated from the wall 9 of the cover by a distance which increases as the distance from the bead cable 5 increases.

From the foregoing description of the principles of the invention and embodiments thereof, it will be apparent that by appropriately arranging the heat-shrinkable cords and the less or non-shrinkable cords in the carcass during the manufacture of the tire, it is possible to control the flexibility of the sidewalls of the tire and to locate zones of greater flexibility or lesser flexibility of the tire in the sidewalls where they serve to best advantage to provide the desired riding comfort while maintaining the desired stability of the tire when operating at either low or high speeds. The zones of greater flexibility and greater rigidity accordingly, can be adjusted to provide the desired performance by the method disclosed herein and thus the method and the resulting product, i.e., the finished tire, are susceptible to considerable variation and modification without departing from the invention. Accordingly, the embodiments of the invention disclosed herein should be considered as illustrative and the invention should not be limited thereby except as defined in the following claims.

I claim:
1. A pneumatic tire having a tread, sidewalls, extending inwardly from opposite edges of said tread, beads at the inner edges of said sidewalls and a carcass extending from one bead to the other through said sidewalls and behind said tread, said carcass comprising at least one mixed ply of cords, some of said cords being composed of heat-shrinkable material and others of said cords being composed of less heat-shrinkable material, said cords of said ply being separated into two layers of parallel cords which are spaced apart different distances in at least one zone between the beads and the tread, the cords of one layer being composed of said heat-shrinkable material shrunken by vulcanizing and the cords of the other layer being composed of said less heat-shrinkable material, and the radial separation of said layers being greater adjacent to said tread than adjacent to said beads, whereby said carcass is given relatively less flexibility adjacent to said tread and relatively more flexibility adjacent to said beads.

2. The tire set forth in claim 1 in which the cords of both layers extend in a generally radial direction in said carcass.

3. A pneumatic tire having a tread, sidewalls extending inwardly from opposite edges of said tread, beads at the inner edges of said sidewalls and a carcass extending from one bead to the other through said sidewalls and behind said tread, said carcass comprising at least one ply of cords, said cords of said ply being separated into two layers of cords which are spaced apart different distances in at least one zone between the beads and the tread, the cords of one layer being composed of heat-shrinkable material shrunken by vulcanizing and the cords of the other layer being composed of less heat-shrinkable material, and the radial separation of said layers being greater adjacent to said tread than adjacent to said beads, whereby said carcass is given relatively less flexibility adjacent to said tread and relatively more flexibility adjacent to said beads, the layers of cords merging into a single layer adjacent to the beads and having maximum separation adjacent to said tread.

4. The tire set forth in claim 3 in which the separation of said layers increases substantially progressively between the said beads and said tread and the separation adjacent to the tread is several times the diameter of the cords.

5. A pneumatic tire having a tread, sidewalls extending inwardly from opposite edges of said tread, beads at the inner edges of said sidewalls and a carcass extending from one bead to the other through said sidewalls and behind said tread, said carcass comprising at least one ply of cords, said cords of said ply being separated into two layers of cords which are spaced apart different distances in at least one zone between the beads and the tread, the cords of one layer being composed of heat-shrinkable material shrunken by vulcanizing and the cords of the other layer being composed of less heat-shrinkable material, and the radial separation of said layers being greater adjacent to said tread than adjacent to said beads, whereby said carcass is given relatively less flexibility adjacent to said tread and relatively more flexibility adjacent to said beads, the layers of cords merging into a single layer at about the mid-height of said sidewalls with the cords of one layer being interposed between the cords of the other layer at said mid-height.

6. The tire set forth in claim 1 in which said layers of cords extend in a generally radial direction in said carcass and are spaced maximum distances in the radially outer zones of said sidewalls.

7. The tire set forth in claim 1 in which said carcass comprises at least two plies of cords, the cords of each ply being composed in part of heat-shrinkable material shrunken by heating and in remainder of material less susceptible to shrinking by heating.

8. The tire set forth in claim 7 in which one ply is disposed inwardly of the other ply and both plies extend on the bias in said carcass, said plies crossing each other.

9. A pneumatic tire having a tread, sidewalls extending inwardly from opposite edges of said tread, beads at the inner edges of said sidewalls and a carcass extending from one bead to the other through said sidewalls and behind said tread, said carcass comprising at least one ply of cords, said cords of said ply being separated into two layers of cords which are spaced apart different distances in at least one zone between the beads and the tread, the cords of one layer being composed of heat-shrinkable material shrunken by heating and the cords of the other layer being composed of material less susceptible to shrinking by heating, said one layer being in part disposed outwardly of said other layer, penetrating through said other layer and being in part disposed inwardly of said other layer.

References Cited

UNITED STATES PATENTS

| | | | |
|---|---|---|---|
| 3,052,275 | 9/1962 | Hylbert | 152—354 |
| 3,160,192 | 12/1964 | Drew | 152—356 |
| 1,969,088 | 8/1934 | Maranville | 152—360 |
| 2,225,042 | 12/1940 | Elliott | 152—356 |

FOREIGN PATENTS

| | | |
|---|---|---|
| 700,790 | 12/1964 | Canada. |
| 547,255 | 3/1932 | Germany. |

DRAYTON E. HOFFMAN, Primary Examiner

C. B. LYON, Assistant Examiner

U.S. Cl. X.R.

152—359